United States Patent
Chu et al.

(10) Patent No.: US 6,844,652 B1
(45) Date of Patent: Jan. 18, 2005

(54) ROTOR STRUCTURE OF LINE-START PERMANENT MAGNET SYNCHRONOUS MOTOR

(75) Inventors: Ming-Tsung Chu, Taichung (TW); Ming-Chih Chen, Shin Chung (TW)

(73) Assignee: PowerPlus Technology Corp., Taipei (TW)

( * ) Notice: Subject to any disclaimer, the term of this patent is extended or adjusted under 35 U.S.C. 154(b) by 0 days.

(21) Appl. No.: 10/720,439

(22) Filed: Nov. 25, 2003

(30) Foreign Application Priority Data

Jul. 30, 2003 (TW) .................................. 92120791 A

(51) Int. Cl.[7] .......................... H03K 1/06; H02K 17/16; H02K 21/12
(52) U.S. Cl. .................. 310/216; 310/211; 310/156.53
(58) Field of Search ................. 310/216, 218, 310/211, 212, 261, 156.53, 156.56, 156.45, 156.47

(56) References Cited

U.S. PATENT DOCUMENTS

| | | | | |
|---|---|---|---|---|
| 3,758,800 A | * | 9/1973 | McLaughlin | 310/211 |
| 4,139,790 A | * | 2/1979 | Steen | 310/156.83 |
| 4,506,181 A | * | 3/1985 | Jones et al. | 310/156.78 |
| 4,568,846 A | * | 2/1986 | Kapadia | 310/156.83 |
| 4,939,398 A | * | 7/1990 | Lloyd | 310/156.53 |
| 5,097,166 A | * | 3/1992 | Mikulic | 310/156.83 |
| 6,727,627 B1 | * | 4/2004 | Sasaki et al. | 310/211 |
| 6,737,783 B2 | * | 5/2004 | Yanashima et al. | 310/211 |

* cited by examiner

Primary Examiner—Tran Nguyen
(74) Attorney, Agent, or Firm—Troxell Law Office PLLC

(57) ABSTRACT

The invention provides a rotor structure of line-start permanent magnet (LSPM) synchronous motor that includes a shaft; four fan-shaped magnetic poles each having a first eccentric circular arcs of the surface of the magnetic poles which has a center O1 that is offset from the center O of the rotor with an offset length OS1 and which makes the maximum thickness of the air gap roughly two to five times as much as the minimum thickness of the air gap; four permanent magnets disposing in the inner loop of each of the fan-shaped magnetic poles□ a plurality of pear-shaped conductor slots disposing in equal spaces in the outer loop of the rotor in each of the fan-shaped magnetic poles and orienting in radial direction having O1 as the center for forming a squirrel cage winding; as well as four recesses at the midpoint of the first eccentric circular arcs of the surface of the magnetic poles in each of the fan-shaped magnetic poles.

15 Claims, 19 Drawing Sheets

ROTOR STRUCTURE OF LINE-START PERMANENT MAGNET SYNCHRONOUS MOTOR

FIELD OF THE INVENTION

The invention relates to a rotor structure of a line-start permanent magnet synchronous motor, and more particularly, to a rotor structure of a hybrid type motor combining the merits of an induction motor and a synchronous motor, and being able to lower the cogging torque and to improve the starting characteristics of a motor.

BACKGROUND OF THE INVENTION

The line-start permanent magnet (LSPM) synchronous motor of the prior art is a hybrid motor with its stator structure being substantially the same as that of an AC induction motor or that of an AC synchronous motor. On the other hand, the rotor structure of this hybrid motor is a combination of the squirrel cage structure in the rotor of the AC induction motor and the permanent magnet structure in the rotor of the AC permanent magnet synchronous motor. When the stator of the LSPM synchronous motor is connected to the power source, a rotating magnetic field is generated by the stator, and an induction current is induced in the squirrel cage structure of the rotor structure. Consequently, the LSPM synchronous motor is started by a starting torque generated by the induction current until the rotating speed of the rotor becomes the same as that of the rotating magnetic field generated by the stator winding, i.e. the rotor reaches a synchronous speed, then, the induction current in the squirrel cage of the rotor vanishes. At this moment, the torque is not generated by the squirrel cage structure anymore but will thoroughly be generated by the interaction of the rotating magnetic field generated by the permanent magnet in the rotor and the stator's winding. Recently, due to the constantly improved material of the permanent magnet and "magnetic energy product", the LSPM can attain a very high "operation efficiency". However, the cogging torque of the permanent magnet synchronous motor of the prior art becomes very large since the permanent magnet with high magnetic energy product is used. As a result, the motor is subject to occurrence of operating vibration and noise. Generally, the stator provides skew channels to improve the demerit, but the winding work of the stator becomes rather difficult.

FIG. 1 is the U.S. Pat. No. 5,925,727, Boyd et al. of the prior art. As shown in FIG. 1, the permanent magnets 28 in the rotor 10 are disposed on the outer side of the squirrel cage conductive bar slot 26. Since the number of permanent magnets 28 used is as many as the number of the squirrel cage conductive bar slot 26, not only the assembling work of the permanent magnets 25 is rather complicated but the motor is subject to generate relatively large cogging torque.

FIG. 2 is the U.S. Pat. No. 5,097,166, Mikulic of the prior art. As shown in FIG. 2, the permanent magnet 64 in the rotor 30 is disposed on the inner side of the squirrel cage conductive bar slot 39. Since the rotor 30 is round in shape without special designed configuration, the cogging torque as well as the vibration and noise of the motor while the motor is in operation is still relatively large.

FIG. 3 is the U.S. Pat. No. 4,922,152, Gleghorn et al. of the prior art. As shown in FIG. 3, since the permanent magnet 18 between the two adjacent poles is disposed to extend up to the circumference of the rotor lamination□ thereby, the permanent magnet between the two poles has to place in the permanent magnet containing slot before the manufacturing process of casting the squirrel cage is performed. The reason is that the permanent magnet subjected to high temperature during the casting process can generate demagnetization.

FIG. 4 is the U.S. Pat. No. 4,748,359, Yahara et al. of the prior art. As shown in FIG. 4, the rotor can improve the cogging torque by adjusting the contour of the permanent magnet. However, since the rotor does not have squirrel cage structure provided, the rotor cannot be line-started without utilizing some other devices.

FIG. 5 is the U.S. Pat. No. 4,358,696, Liu et al. of the prior art. As shown in FIG. 5, two sets of symmetrically disposed permanent magnets constitute four poles. But since there are permanent magnets extended up to the circumference of the rotor lamination□ thereby, as described before, the permanent magnet between the two poles has to place in the permanent magnet containing slot before the manufacturing process of casting the squirrel cage is performed. The reason is that the permanent magnet subjected to high temperature during the casting process can generate demagnetization.

FIG. 6 is the U.S. Pat. No. 4,139,790, Steen et al. of the prior art. As shown in FIG. 6, the permanent magnet 27~30 is disposed on the inner side of the permanent magnet apertures 23~26 of the squirrel cage structure of the rotor 13. But, as described before, since the rotor 13 is round in shape without special designed configuration, therefore, the cogging torque as well as the vibration and noise of the motor while the motor is in operation are still relatively large.

FIG. 7 is the Taiwan patent 371,126, Kang et al. and FIG. 8 is the Taiwan patent 362,843, Kang et al. of the prior art. As shown in FIG. 7 and FIG. 8, the distance between the center of the rotor and the surface of the rotor varies with the radius of curvature of the surface of the rotor being smaller than that of a common rotor in round shape. However, just how the curvature of the surface of the rotor varies is not explained anywhere in their specifications. Moreover, in the Taiwan patent 371,126, the second permanent magnet containing slots 16 extends up to the circumference of the rotor lamination. Normally, the manufacturing process of the squirrel cage structure is to place the whole rotor lamination in the mold, then, the molten aluminum with melting point at 268° C. is poured into the conductive bar slots to form conductive bars. In addition, at both ends of the rotor lamination, end rings are formed by aluminum material to be connected to the ends of the rotor lamination and to each of the conductive bars to constitute an integrated squirrel cage structure. The technical features of the above-mentioned Taiwan patents TW 371,126 and TW 362,843 are that the permanent magnet containing slots extend up to the circumference of the rotor lamination, and the conductive bars containing slots of the squirrel cages of the rotor structure are disposed closed to the circumference of the rotor lamination too. Therefore, it is necessary to place the permanent magnets in position before the casting manufacturing process of the squirrel cage structure of the rotor performs. However, generally, among all the permanent magnets of rare earth metals having high magnetic energy products, the permanent demagnetization temperatures are less than 200° C. Placing the permanent magnets in the permanent magnet containing slots beforehand can cause the permanent magnets to be subject to demagnetization during the casting manufacturing process.

FIG. 9 is the Japan patent 2003-23740 (P2003-23740A) of the prior art. As shown in FIG. 9, a permanent magnet is disposed for each of the corresponding inner side of the magnetic poles. Moreover, the invention describes only that the arc of the surface of the rotor lamination for each poles is the connection between the location where the distance from the center of the rotor is maximum and the location where the distance from the center of the rotor is minimum. However, no explanation is given anywhere in the specification as to what kind of the curve of the arc it belongs to. What is more, the prior art does not provide any means to adequately attenuate the magnetic flux of the magnetic pole to reduce the self-retaining torque caused by the magnetic flux of the magnetic poles. Therefore, the prior art cannot improve the starting characteristic of the motor at the transient state during the operation from "stop" to "start" of the LSPM synchronous motor. Furthermore, as pointed out in the preceding discussion, since the rotor does not have squirrel cage structure provided, the rotor cannot be line-started without utilizing some other devices.

The foregoing statements are the disadvantages of the prior art.

SUMMARY OF THE INVENTION

In light of the demerits of the prior art, the invention provides a rotor structure of a line-start permanent magnet (LSPM) synchronous motor that aims to ameliorate at least some of the disadvantages of the prior art or to provide a useful alternative.

One of the objectives of the invention described in the first embodiment of the invention is to utilize the conventional LSPM synchronous motor of the hybrid type. This motor of the invention provides four fan-shaped magnetic poles having a central angle 90°. The circular arcs of the surfaces of the magnetic poles are defined as "the first eccentric circular arcs of the surface of the magnetic poles" having four "first eccentric points O1" as their centers that are offset from the rotor center O with offset lengths OS1 and radii R1. If the radius of the rotor is R, then R−R1=OS1. In this way, the air gap thickness of the motor constitutes a gradual and non-uniform distribution along the circumferences between the rotor and the stator. The length of the offset OS1 and the radius of curvature of the circular arc R1 can adjust to accommodate the variation of the range of the air gap thickness. The maximum air gap thickness T of the motor is anywhere from two to five times as much as the minimum air gap thickness t1, that is T=2t1~5t1. In this way, the fact that the radial component of the magnetic flux density becomes very close to a sinusoidal wave distribution can further lower the cogging torque of the motor and reduce the operating vibration and noise of the motor. As the motor employs the first eccentric circular arcs of the surface of the magnetic poles, when the loading of the motor increases, even though the magnetic flux formed by the stator winding increases accordingly, the motor can still attenuate the effect of demagnetization of the magnetic field of the stator with respect to the permanent magnet. This is because that the air gap is relatively large at both ends of each of the fan-shaped magnetic poles.

Another objective of the invention described also in the first embodiment of the invention is to provide a plurality of pear-shaped conductive bar slots for forming squirrel cage winding. Each conductive bar slots is the same in distance with respect to each of the first eccentric points O1. The conductive bar slots are disposed in annular shape and in equal space around the outer loop of the fan-shaped magnetic pole such that they are all oriented to the first eccentric points O1. The salient spaces between the conductive bar slots form the tooth-part of the rotor wherein the salient spaces (tooth-part of the rotor) between the fan-shaped magnetic poles are relatively small.

One other objective of the invention described in the first embodiment of the invention is to provide a semi-circle recess at the mid-way of the first eccentric circular arcs of the surface of the magnetic poles. The diameter of the semi-circle recess is almost equal to the width of the tooth part of the stator of the motor. The recess can adequately attenuate the magnetic flux of the magnetic pole of the motor. In addition, the recess can also reduce the self-retaining torque caused by the magnetic flux of the magnetic pole of the motor so that the motor can improve its starting characteristic.

One further objective of the invention described in the second embodiment of the invention is to provide another two recesses on both sides of the original recess. In this way, there are three recesses in each of the four magnetic poles, and there will be twelve recesses all together such that the motor can further reduce the self-retaining torque caused by the magnetic flux of the magnetic pole of the motor so that the motor can improve its starting characteristic. As for the location of the recesses, it will depend on the following situations. If the number of the plurality of conductive bar slots in each of the fan-shaped magnetic poles is an even number, the location of the recesses are aligned with the corresponding location of the tooth-part of the rotor. But, if the number of the plurality of conductive bar slots in each of the fan-shaped magnetic poles is an odd number, the location of the recesses are aligned with the location of the conductive bar slots of the rotor.

One further objective of the invention described in the third embodiment of the invention is to provide a smooth curve of "the second eccentric circular arcs of the surface of the magnetic pole" to substitute the above-mentioned semi-circle recesses. In this way, the motor can adequately reduce the radial component distribution of the magnetic flux density of the air gap at the mid-way of the second eccentric circular arcs of the surface of the magnetic poles. Moreover, the motor can further reduce the cogging torque as well as the vibration and noise during the operation. What is more, the LSPM synchronous motor can slightly attenuate the magnetic flux of the magnetic pole to reduce the transient state during the operation from stop to start due to the self-retaining torque caused by the fan-shaped magnetic pole of the motor. In this third embodiment, one can adjust the radius of the second eccentric circular arcs and the length of offset OS2 of the center of curvature O2 of the second eccentric circular arcs of the surface of the magnetic poles to accommodate the variation of the range of the air gap thickness. In this way, not only the motor can adequately reduce the self-retaining torque, but also the radial component of the magnetic flux density becomes very close to a sinusoidal wave distribution.

The conductive bar slots for forming the squirrel-cage-winding can have various kinds of configuration to meet the requirements of the starting torque and starting characteristic of LSPM synchronous motor. Therefore, one further objective of the invention is to provide the following four types of exemplary practice for each of the three embodiments of the invention.

In the first exemplary practice, the conductive bar slots of the rotor are in circular shape.

In the second exemplary practice, the permanent magnet of each of the fan-shaped magnetic poles is divided into two pieces, each correspond to a 45° central angle. Consequently, the configuration of an eight-permanent-magnet of the rotor appears to be an octagon.

In the third exemplary practice, the permanent magnet of each of the fan-shaped magnetic pole is also divided into two pieces, each also correspond to a 45° central angle. Consequently, the configuration of an eight-permanent magnet of the rotor appears to be a four-piece petal.

In the fourth exemplary practice, the permanent magnet of each of the fan-shaped magnetic pole is divided into four pieces. Consequently, the configuration of a sixteen-permanent-magnet of the rotor appears to be in badge shape.

To achieve the foregoing objectives, the invention provides a rotor structure of line-start permanent magnet synchronous motor that includes a shaft; four fan-shaped magnetic poles each having a the first eccentric circular arcs of the surface of the magnetic poles which has a center O1 that is offset from the center O of the rotor with an offset length OS1 and which makes the maximum thickness of the air gap roughly two to five times as much as the minimum thickness of the air gap; four permanent magnets disposing in the inner loop of each of the fan-shaped magnetic poles□ a plurality of pear-shaped conductor slots disposing in equal spaces in the outer loop of the rotor in each of the fan-shaped magnetic poles and orienting in radial direction having O1 as the center for forming a squirrel cage winding; as well as four recesses at the midpoint of the first eccentric circular arcs of the surface of the magnetic poles in each of the fan-shaped magnetic poles.

In order to understand fully the objectives, characteristics, and the efficacy of the invention in preferred embodiments, a detailed illustration with accompanied drawings is described as follows:

DETAILED DESCRIPTION OF THE EMBODIMENTS

Figure 1:
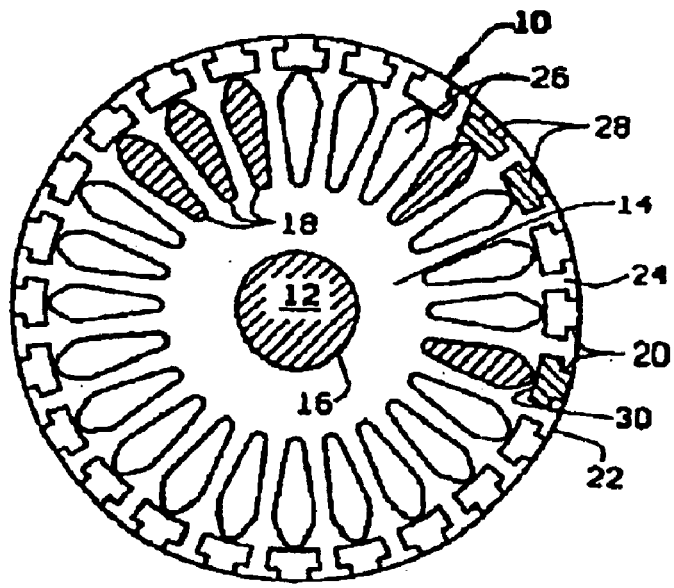
FIG. 1 is a schematic cross-sectional view of the rotor structure of "line start permanent magnet motor" of the U.S. Pat. No. 5,952,757, Boyd et al. of the prior art.
Figure 2:
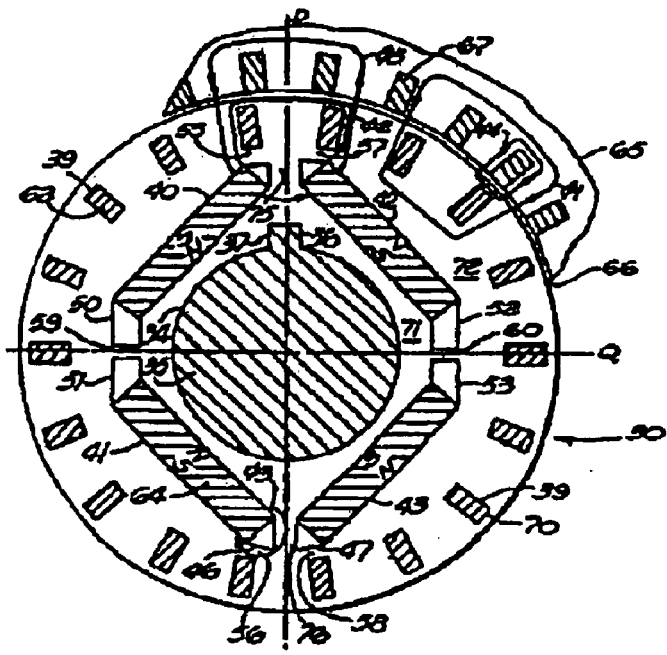
FIG. 2 is a schematic cross-sectional view of the rotor structure of "rotor lamination for an ac permanent magnet synchronous motor" of the U.S. Pat. No. 5,097,166, Mikulic et al. of the prior art.
Figure 3:
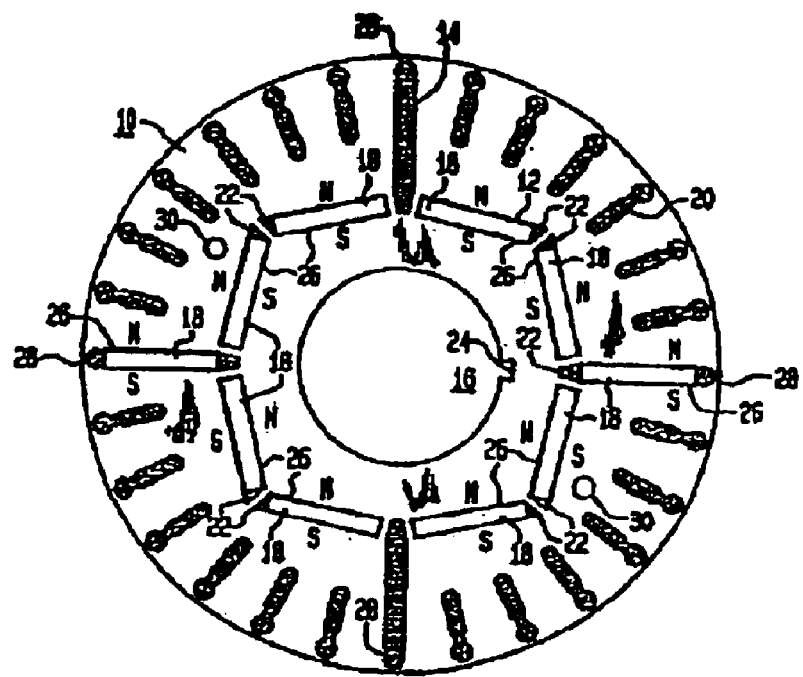
FIG. 3 is a schematic cross-sectional view of the rotor structure of "synchronous machine rotor lamination" of the U.S. Pat. No. 4,922,152 Gleghorn et al. of the prior art.
Figure 4:
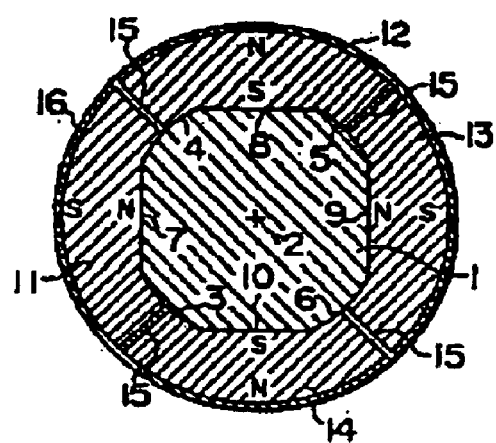
FIG. 4 is a schematic cross-sectional view of the rotor structure of "permanent magnet rotor with sinusoidal flux pattern" of the U.S. Pat. No. 4,748,359, Yahara et al. of the prior art.
Figure 5:
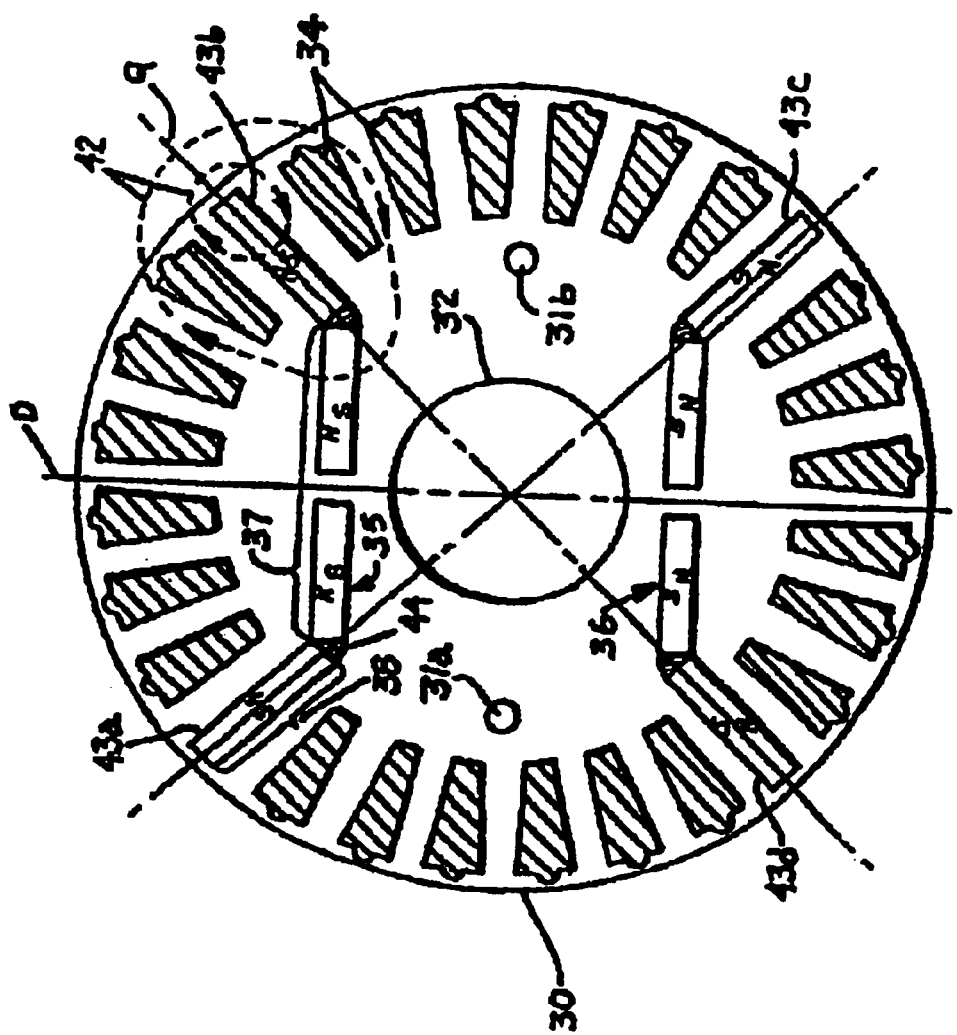
FIG. 5 is a schematic cross-sectional view of the rotor structure of "permanent magnet synchronous motor rotor" of the U.S. Pat. No. 4,358,696, Liu et al. of the prior art.
Figure 6:
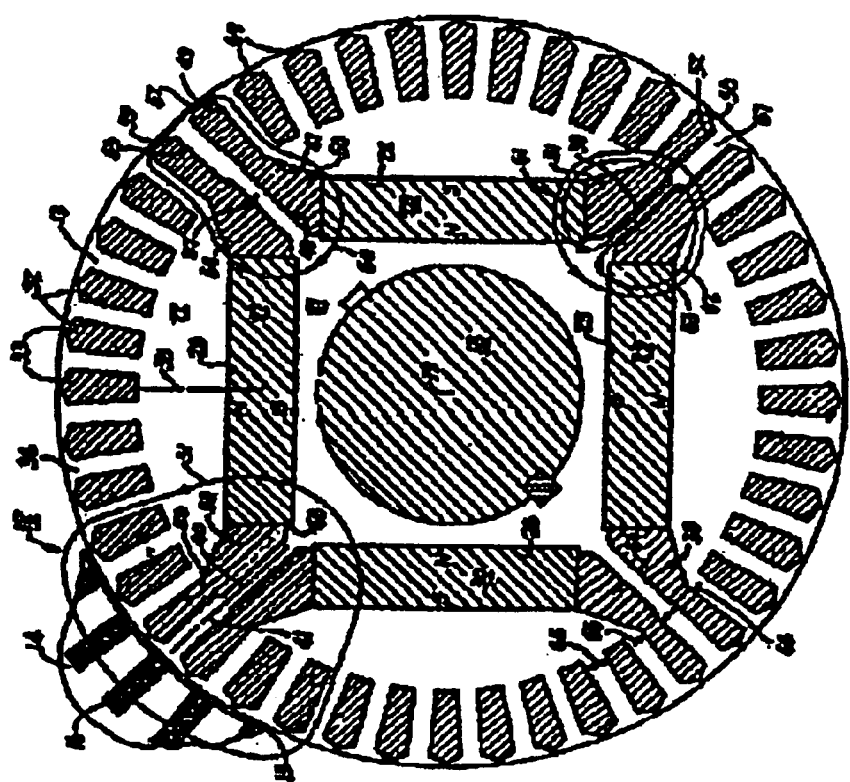
FIG. 6 is a schematic cross-sectional view of the rotor structure of a "direct axis aiding permanent magnets for a laminated synchronous motor rotor" of the U.S. Pat. No. 4,139,790, Steen et al. of the prior art.
Figure 7:
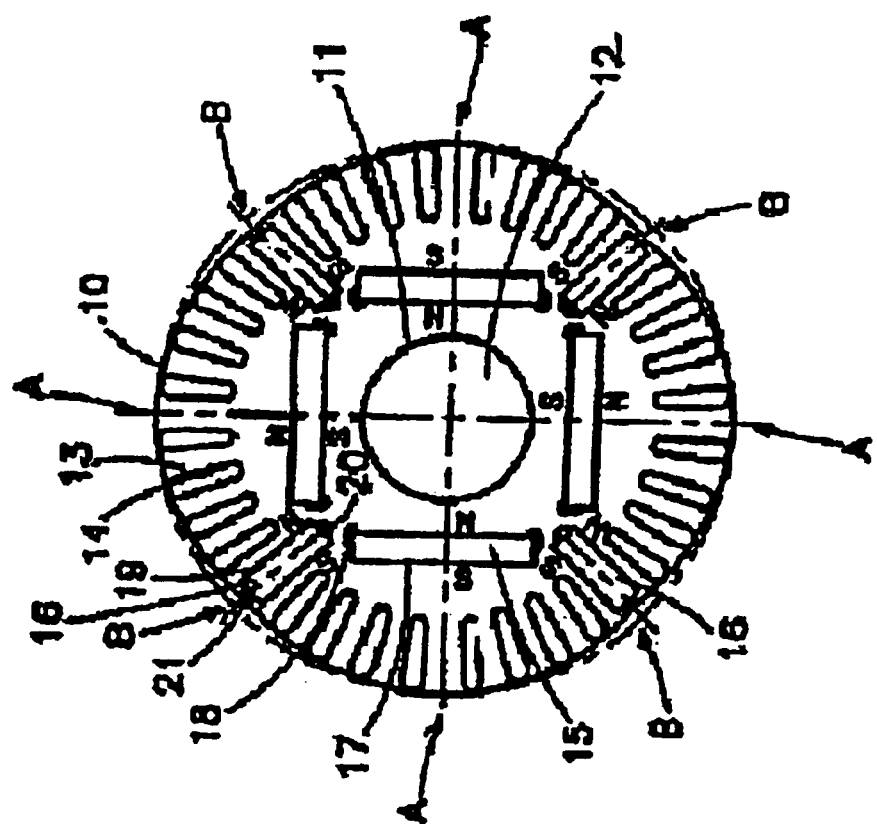
FIG. 7 is a schematic cross-sectional view of the rotor structure of a Taiwan PATENT TW 371,126, Kang et al. of the prior art.
Figure 8:
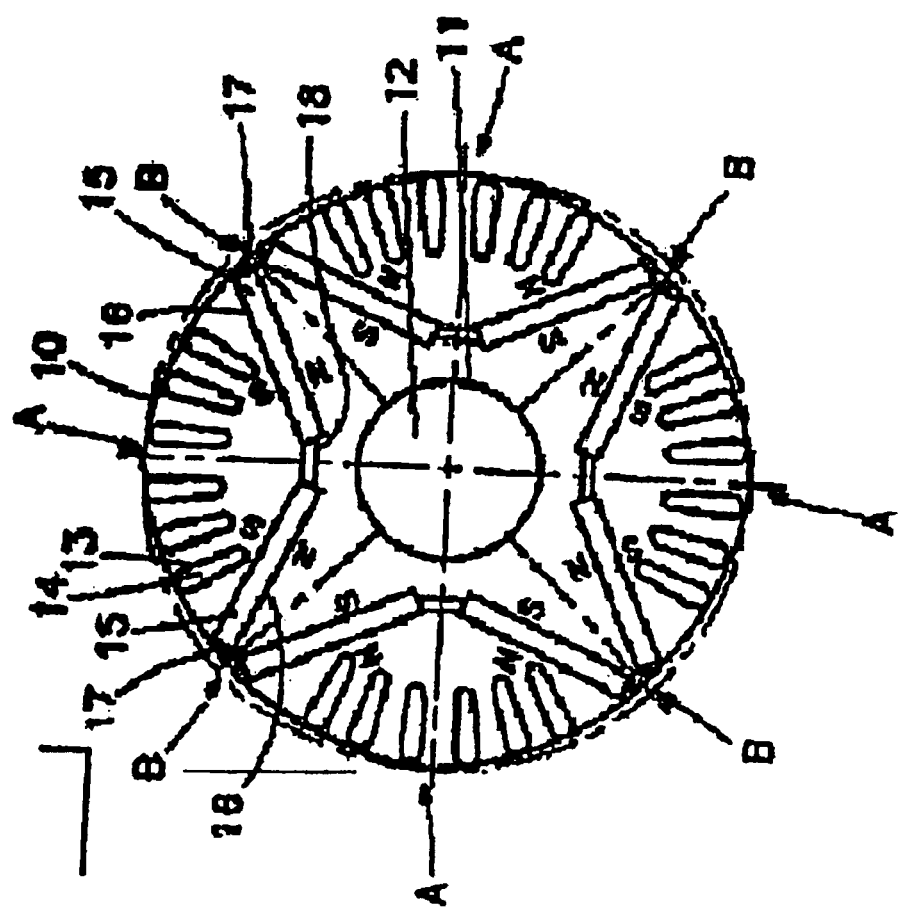
FIG. 8 is a schematic cross-sectional view of the rotor structure of a Taiwan PATENT TW 362,843, Kang et al. of the prior art.
Figure 9:
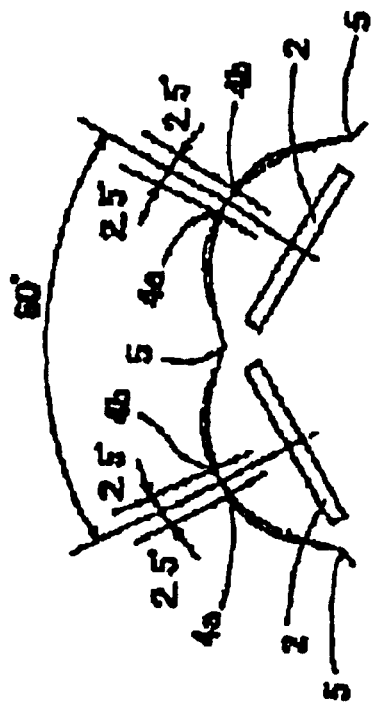
FIG. 9 is a schematic cross-sectional view of the rotor structure of a Japan PATENT 2003-23740(P2003-23740A), of the prior art.
Figure 9:
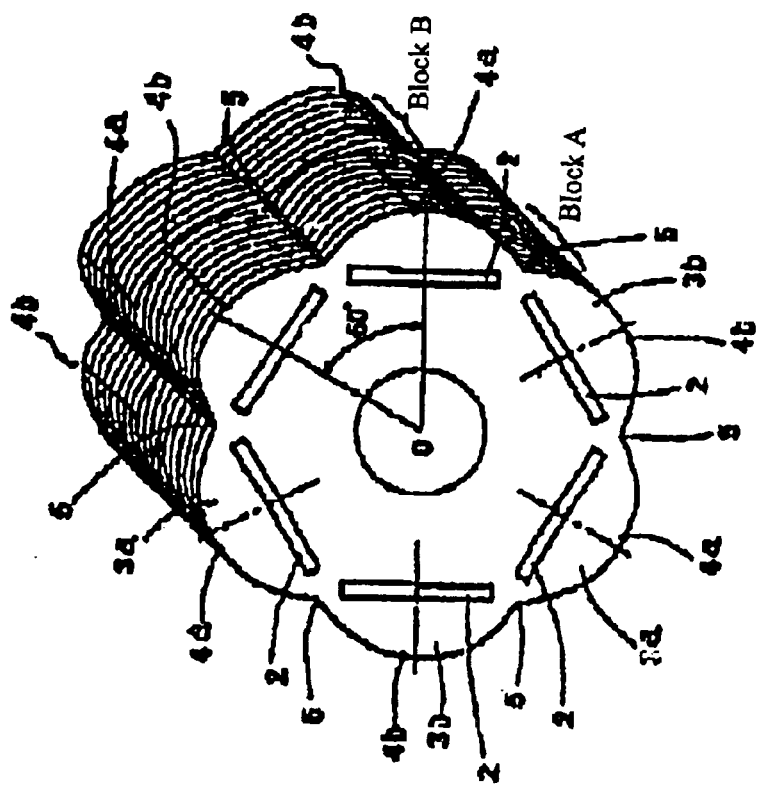
Figures 10A, 10B:
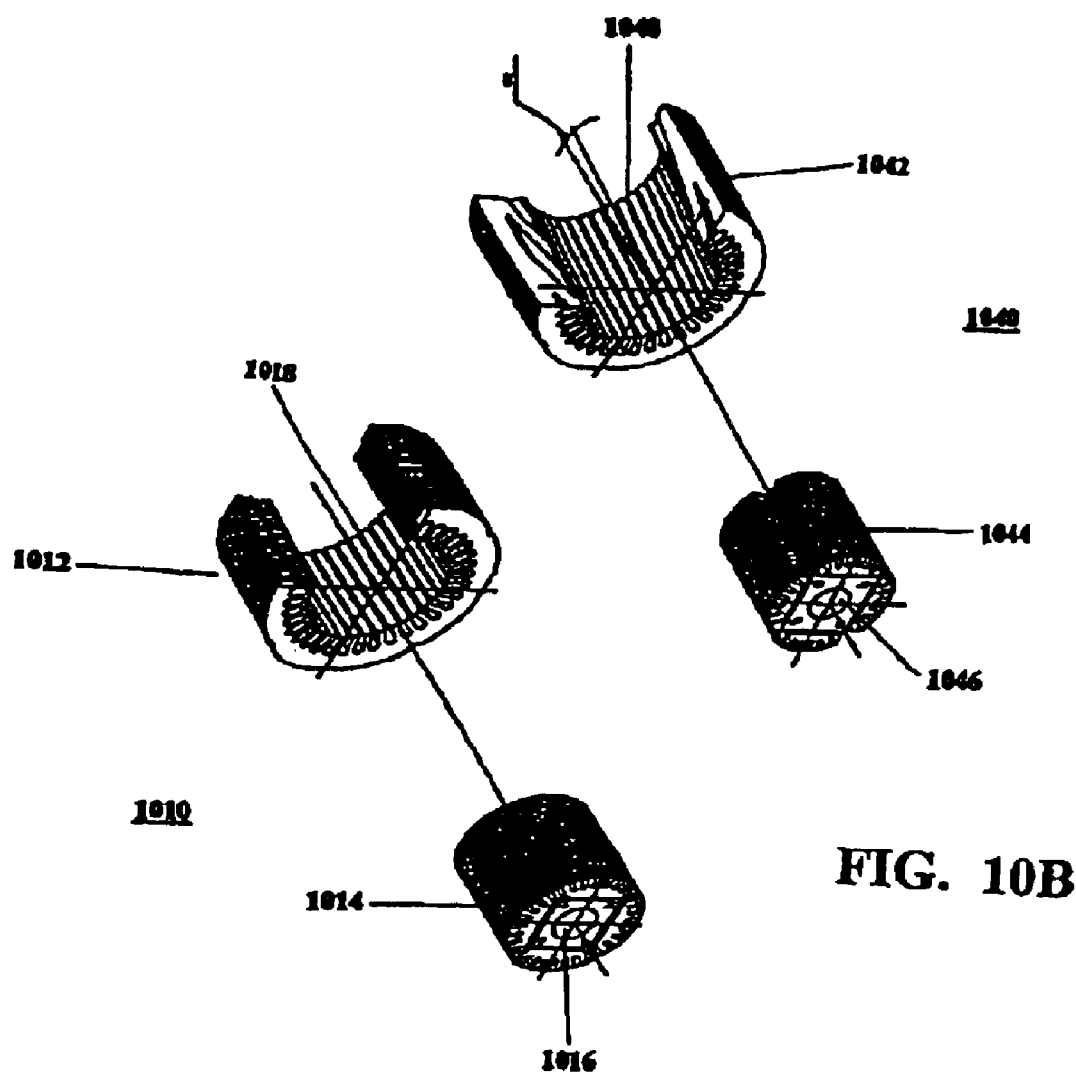
FIG. 10A is an exploded view of the LSPM synchronous motor having straight channels in the stator of the invention.
FIG. 10B is an exploded view of the LSPM synchronous motor having skew channels in the stator of the invention as compare with the straight channels in FIG. 10A.

FIG. 10A shows the line-start permanent magnet (LSPM) synchronous motor 1010 of the invention using straight channels 1018 in stator 1012 in contrast with the similar motor 1040 shown in FIG. 10B that uses skew channels 1048 in stator 1042. As shown in FIG. 10A, the LSPM synchronous motor 1010 of the invention includes a stator 1012, a rotor 1014, and a shaft 1016 in which the stator 1012 uses straight channels 1018. As shown in FIG. 10B, the LSPM synchronous motor 1040 includes a stator 1042, a rotor 1044, and a shaft 1046 in which the stator 1042 uses skew channels 1048.

Figure 11:
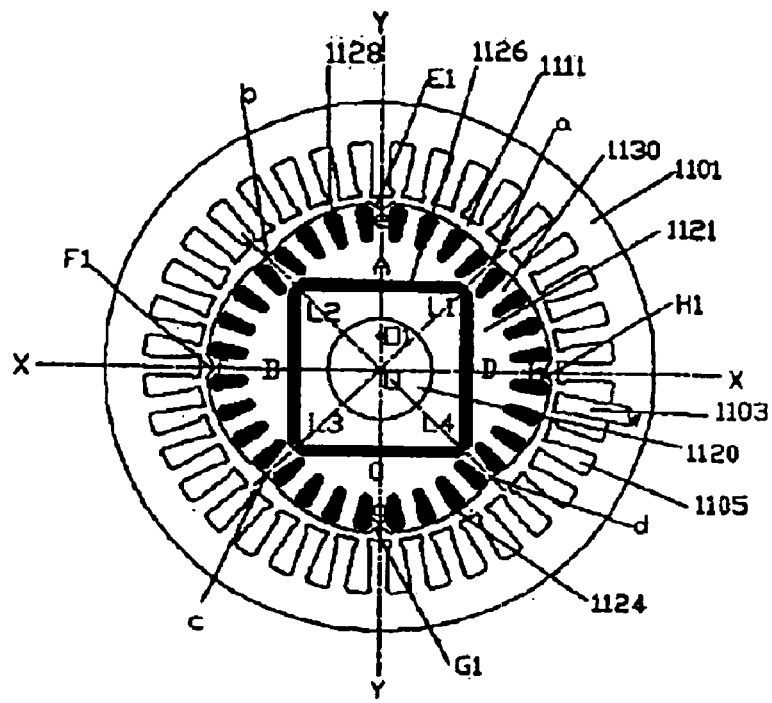
FIG. 11 is a schematic cross-sectional view of the rotor structure of the LSPM synchronous motor of the first embodiment of the invention.

As shown in FIG. 11, the LSPM synchronous motor includes an outer stator 1101 (simply stator hereafter), an inner rotor 1121 (simply rotor hereafter), and an air gap 1111 positioned between the stator 1101 and the rotor 1121. The stator 1101, which includes a plurality of stator's tooth-part 1103 positioning in the inner loop and having a width w, and a plurality of stator's channel 1105 disposed in staggered manner and in annular shape is stacked up and laminated by a plurality of silicon steel plates. The rotor 1121 includes a shaft 1120 and four permanent magnets 1126 in the inner loop, as well as a plurality of conductive bar slots 1128 disposed in annular shape in the outer loop for forming squirrel cage, and salient tooth parts 1130 positioned between the conductive bar slots 1128.

As shown again in FIG. 11, the mutually perpendicular lines X—X and Y—Y are centerlines of the rotor 1121. The radial separating lines L1, L3 and L2, L4, which forms a 45° angle with respect to the centerlines X—X and Y—Y respectively, divide the rotor 1121 into four fan-shaped magnetic poles A, B, C, and D each having a 90° central angle.

Figure 12:
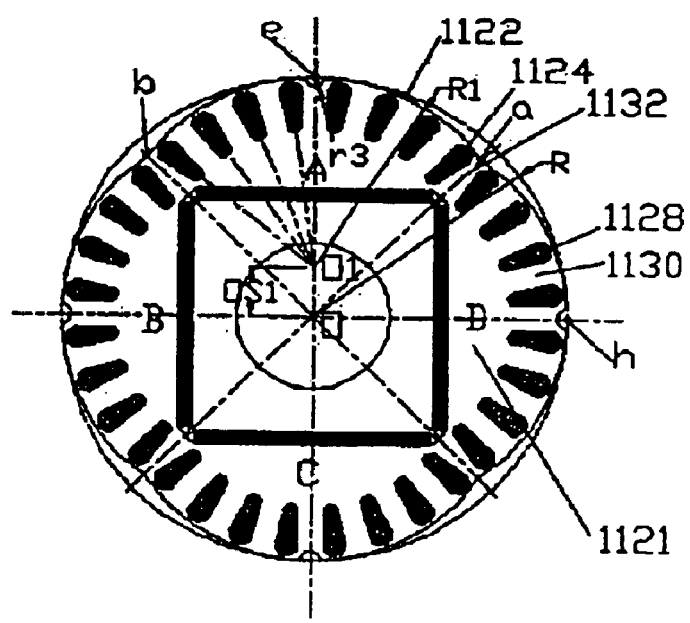
FIG. 12 is a schematic cross-sectional view of the rotor structure of the LSPM synchronous motor of the first embodiment of the invention showing the locations of the semi-circular recesses when the number of the conductive bar slots in each of the fan-shaped magnetic pole is an even number.

FIG. 12 is an enlarged drawing of FIG. 11. As shown in FIG. 12, the center of the rotor 1121 is O, and the radius of curvature of the circular arc 1122 of the rotor 1121 is R. The circular arcs of the surfaces of the fan-shaped magnetic poles are defined as "first eccentric circular arcs of the surface of the magnetic poles" whose center of curvature $O_1$ is offset from O, the length of the offset $OO_1$ is OS1, and the radius of curvature is R1, therefore, R−R1=OS1.

As shown again in FIG. 11, the radial separating lines L1, L2, L3, and L4 intersect the "first eccentric circular arcs of the surface of the magnetic poles" 1124 at a, b, c, and d respectively. These four intersect points are the two end points a and b of the "first eccentric circular arcs of the surface of the magnetic poles" ab of the fan-shaped magnetic poles A, the two end points b and c of the "first eccentric circular arcs of the surface of the magnetic poles" bc of the fan-shaped magnetic poles B, the two end points c and d of the "first eccentric circular arcs of the surface of the magnetic poles" cd of the fan-shaped magnetic poles C, and the two end points d and a of the "first eccentric circular arcs of the surface of the magnetic poles" da of the fan-shaped magnetic poles D respectively. Moreover, the centerlines X—X and Y—Y intersect the "first eccentric circular arcs of the surface of the magnetic poles" 1124 respectively at four points e1, f1,g1, and h1 in the fan-shaped magnetic poles A, B, C, and D. Besides, these four points e1, f1,g1, and h1 are the midpoints of the "first eccentric circular arcs of the surface of the magnetic poles" ab, bc, cd, and da of the fan-shaped magnetic poles A, B, C, and D respectively.

As shown again in FIG. 11, the LSPM synchronous motor 11 of the first embodiment of the invention provides semi-circle recesses E1, F1, G1, and H1 at the midpoints e1, f1,g1, and h1 of the "first eccentric circular arcs of the surface of the magnetic poles" ab, bc, cd, and da of the fan-shaped magnetic poles A, B, C, and D. The semi-circle recesses E1, F1, G1, and H1 having diameter equals to the width w of the tooth-part 1103 of the stator 1101 and radius r=w/2 has fillets 1136 at their both ends to connect smoothly to the "first eccentric circular arcs of the surface of the magnetic poles" 1124.

Figure 16:
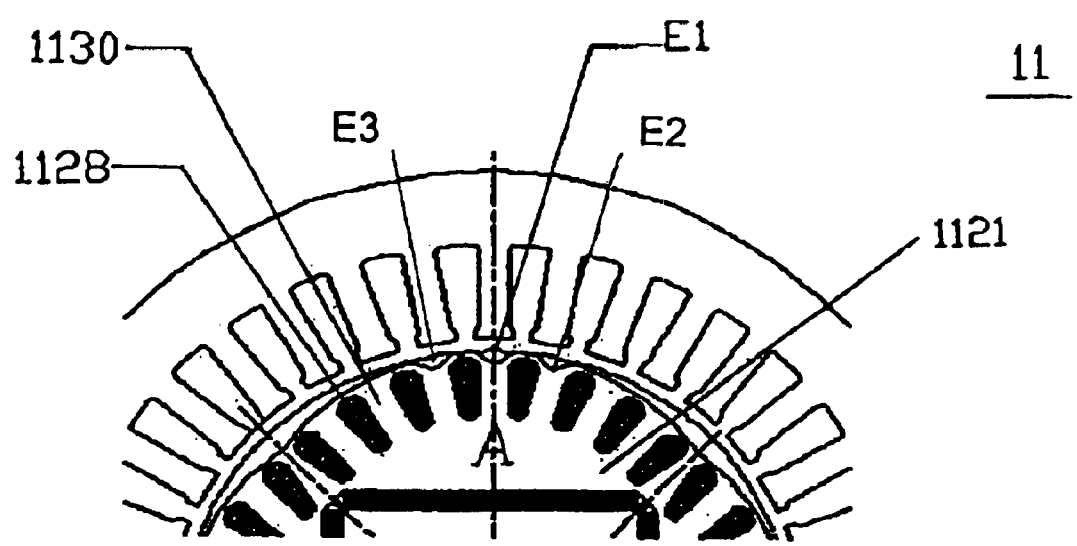
FIG. 16 is a schematic cross-sectional view of the rotor structure of the LSPM synchronous motor of the second embodiment of the invention showing the locations of the semi-circular recesses when the number of the conductive bar slots in each of the fan-shaped magnetic pole is an even number.
Figure 17:
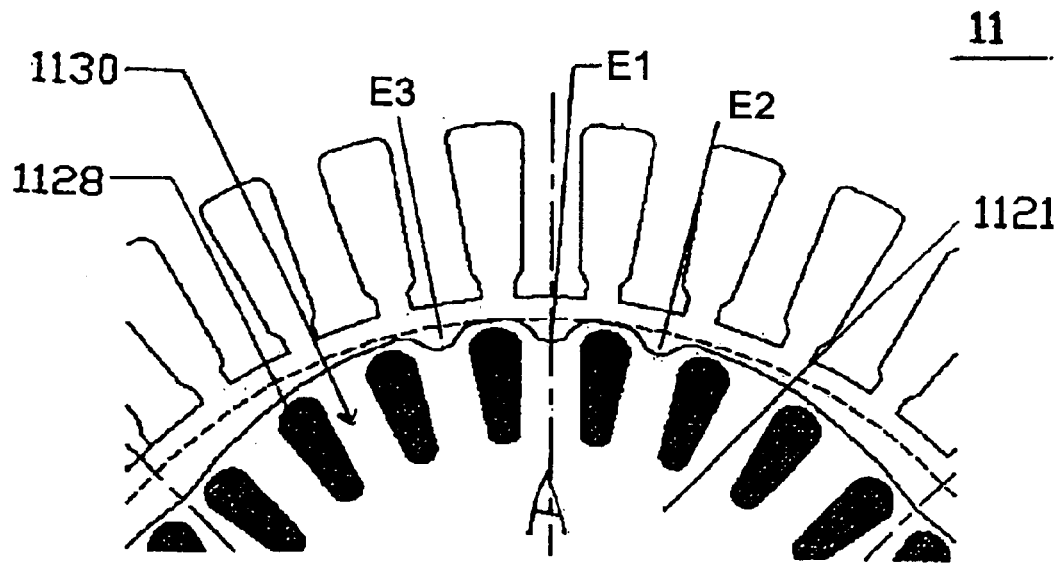
FIG. 17 is an enlarged partial schematic cross-sectional view of FIG. 16 to highlight the variation of the curvature of the first eccentric circular arcs of the surface of the magnetic poles of the second embodiment of the invention in contrasting with the circular arc of the magnetic pole.

As shown in FIG. 16 and FIG. 17, besides providing recesses E1, F1, G1, and H1 aligned with the locations of the tooth-part 1130 of the rotor 1121, the LSPM synchronous motor 11 of the second embodiment of the invention also provides recesses E2, F2, G2, and H2 as well as E3, F3, G3, and H3 (see also FIG. 11 and FIG. 18 ) on each side of the recesses E1, F1, G1, and H1 having the same size and aligned with the locations of the adjacent tooth-part 1130 of the rotor 1121. This is the situation when the number of the plurality of conductive bar slots 1128 of each of the fan-shaped magnetic poles A, B, C, and D is an even number. If the number of the plurality of conductive bar slots 1128 of each of the fan-shaped magnetic poles A, B, C, and D is an odd number, the recesses E2, F2, G2, and H2 as well as E3, F3, G3, and H3 on each side of the recesses E1, F1, G1, and H1 having the same size are aligned with the locations of the adjacent conductive bar slots 1128 of the rotor 1121. Therefore, there are three recesses in each of the fan-shaped magnetic poles A, B, C, D, and there are twelve recesses altogether in the rotor 1121.

Figure 19:
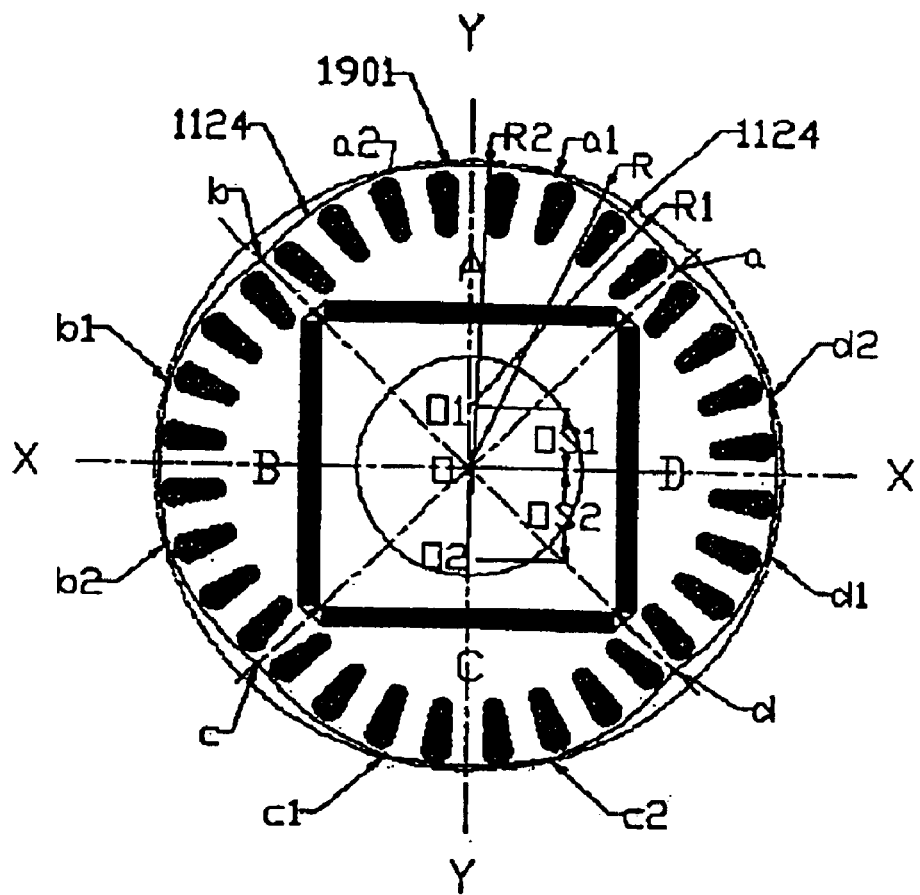
FIG. 19 is a schematic cross-sectional view of the rotor structure of the LSPM synchronous motor of the third embodiment of the invention.
Figure 20:
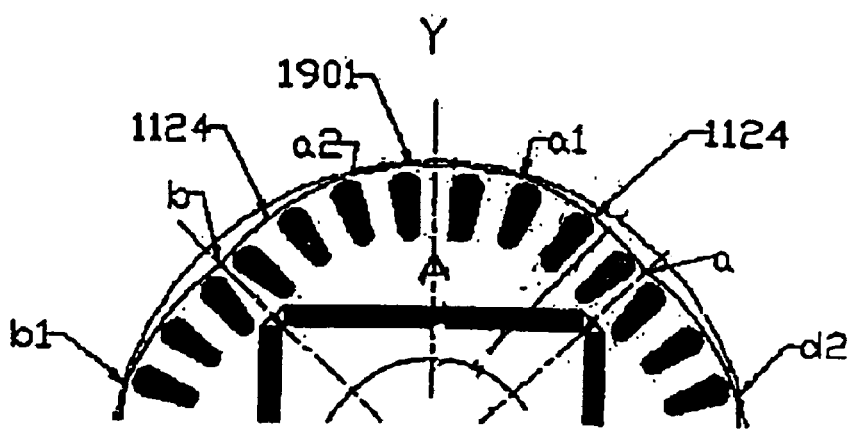
FIG. 20 is an enlarged partial schematic cross-sectional view of FIG. 19 to highlight the variation of the curvature of the first eccentric circular arcs and the second eccentric circular arcs of the surface of the magnetic poles of the third embodiment of the invention in contrasting with the circular arc of the magnetic pole.
Figure 21:
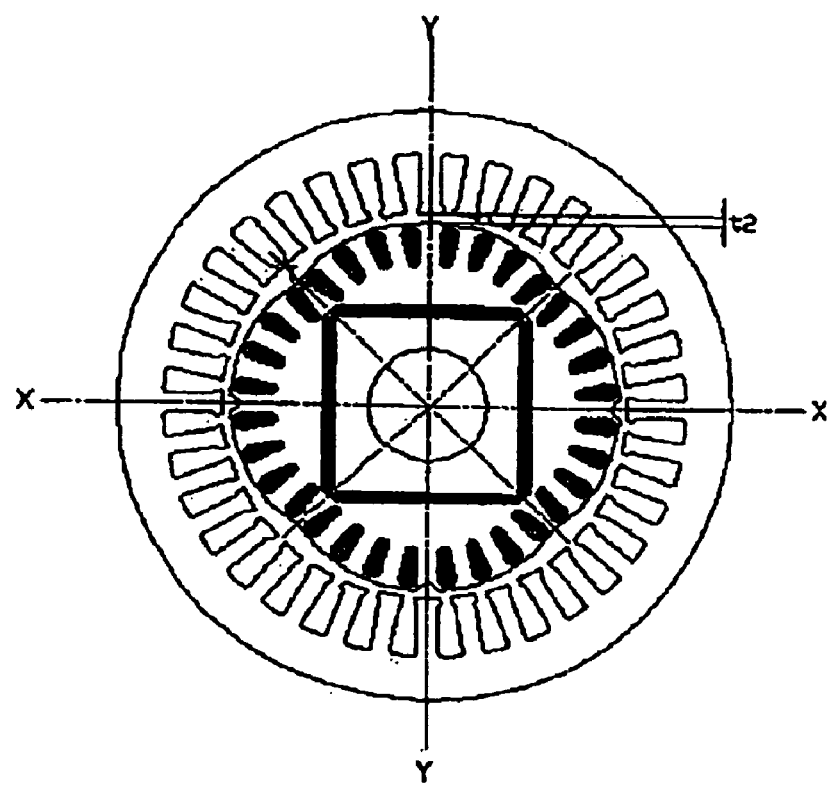
FIG. 21 is a schematic cross-sectional view of the rotor structure of the LSPM synchronous motor of the third embodiment of the invention. It shows the distribution of the variation of the air gap thickness of the second eccentric circular arcs of the surface of the magnetic poles wherein the minimum and the maximum thickness of the air gap are being t2 and T respectively.

As shown in FIG. 19, in the LSPM synchronous motor 11 of the third embodiment of the invention, the semi-circle recesses E1, F1, G1, H1 as shown in FIG. 12, as well as the semi-circle recesses E1, F1, G1, H1□E2, F2, G2, H2□ and E3, F3, G3, H3 as shown in FIG. 16 are all replaced by the "second eccentric circular arcs of the surface of the magnetic poles" 1901 having center of curvature $O_2$ offset from the center of the rotor O with the offset length OS2 of the offset $OO_2$ and radius of curvature R2, therefore, R2−R=OS2.

As shown again in FIG. 19, in the third embodiment of the invention, the tangent points between the "second eccentric circular arcs of the surface of the magnetic poles" 1901 and the "first eccentric circular arcs of the surface of the magnetic poles" 1124 in the fan-shaped magnetic poles A, B, C, and D are a1 and a2□b1 and b2□c1 and c2□ as well as d1 and d2 respectively. In other words, in the third embodiment of the invention, the "second eccentric circular arcs of the surface of the magnetic poles" 1901 in the fan-shaped magnetic poles A, B, C, and D are a1a2, b1b2, c1c2, and d1,d2 respectively, while in the first embodiment and second embodiment of the invention, the "first eccentric circular arcs of the surface of the magnetic poles" becomes aa1 and a2b□bb1 and b2c□cc1 and c2d□ as well as dd1 and d2a.

Figure 14:
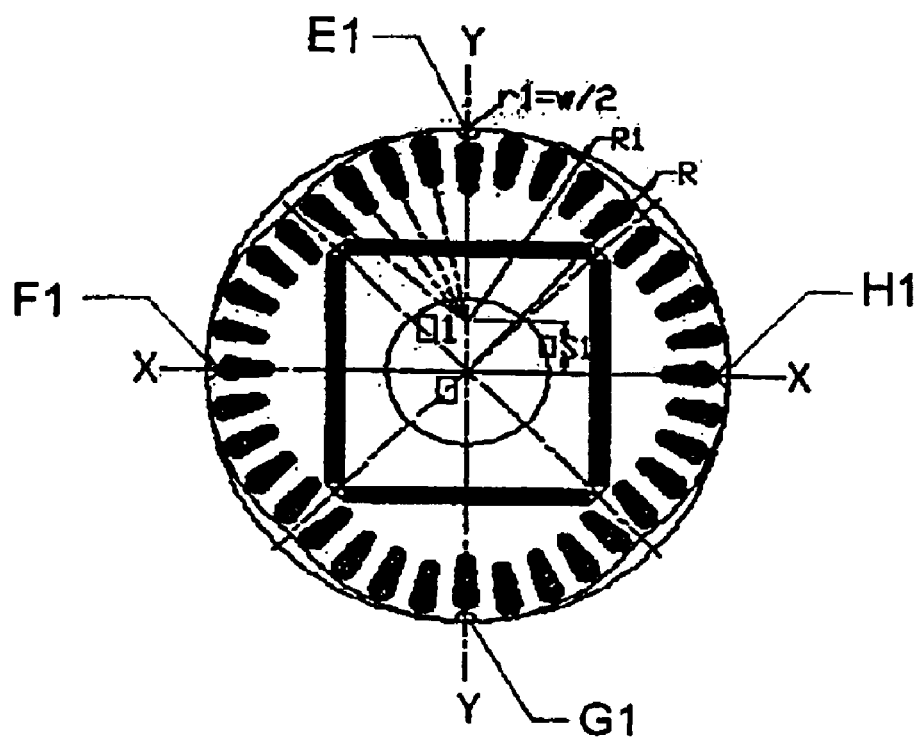
FIG. 14 is a schematic cross-sectional view of the rotor structure of the LSPM synchronous motor of the first embodiment of the invention showing the locations of the semi-circular recesses when the number of the conductive bar slots in each of the fan-shaped magnetic pole is an odd number.
Figure 18:
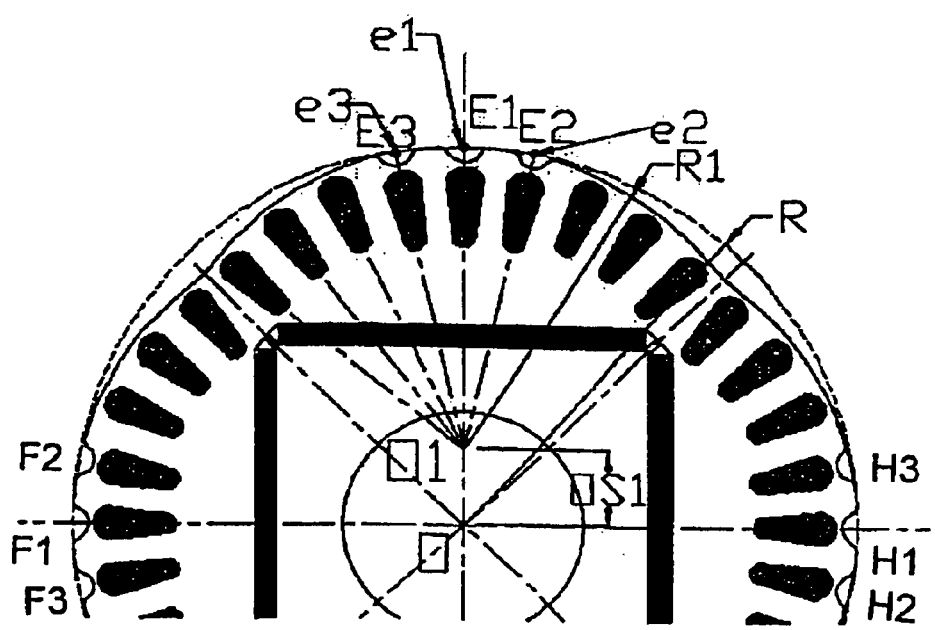
FIG. 18 is a schematic cross-sectional view of the rotor structure of the LSPM synchronous motor of the second embodiment of the invention showing the locations of the semi-circular recesses when the number of the conductive bar slots in each of the fan-shaped magnetic pole is an odd number.

As shown also in FIG. 11, there is a permanent magnet 1126 in each of fan-shaped magnetic poles A, B, C, and D of the LSPM synchronous motor 11 of the invention. Moreover, there are same number of conductive bar slots 1128 in each of the fan-shaped magnetic poles A, B, C, and D that are oriented toward the center O1 (see FIG. 12) of the "first eccentric circular arcs of the surface of the magnetic poles" 1124, and are disposed in equal spaces and uniformly distributed around the outer loop of the rotor 1121. What is more, as shown in FIG. 14 and FIG. 18, except for the situation that the number of the conductive bar slots 1128 in each of the fan-shaped magnetic poles A, B, C, and D is an odd number and each of the conductive bar slots 1128 aligned with the locations of the semi-circle recesses needs to adequately move toward the center O1 of the fan-shaped magnetic poles A, B, C, and D, the rest of the conductive bar slots 1128 are all in equal distance with respect to the center of curvature O1, and the salient parts between each of the two adjacent conductive bar slots 1128 become the tooth parts 1130 of the rotor 11. Therefore, the angle between the adjacent conductive bar slots in each of the fan-shaped magnetic poles A, B, C, and D is fixed, and the spaces (i.e. the width of the tooth part 1130 of the rotor 11) between the conductive bar slots 1128 in each of the fan-shaped magnetic poles A, B, C, and D remains equal. Although adequate width of the conductive bar slots is recommended, it is not appropriate to have the width so large to that extent that it makes the tooth parts 1130 between the conductive bar slots 1128 of the rotor 11 become too small in width (i.e. the tooth part thickness becomes too small). Since if the space between the conductive bar slots 1128 of the rotor 11 become too small in width, i.e. the tooth part thickness becomes too small, the magnetic flux passing through them becomes so dense that it generates the phenomenon of magnetic saturation. Preferably, the space 1132 (equivalent to the rotor's tooth part at the location between the two adjacent magnetic poles) between the adjacent conductive bar slots 1128 having each of the conductive bar slots 1128 belong to each of the two adjacent magnetic poles is as small as possible. The relatively small space 1132 not only can reduce the magnetic flux leakage between the magnetic poles, but can also make the magnetic flux density in radial direction closes to a sinusoidal wave distribution. However, in order to keep an appropriate structural strength to avoid being warping during the rotation of the rotor, a minimum width of the space 1132 should be kept to retain the allowable minimum deformation.

Figure 13:
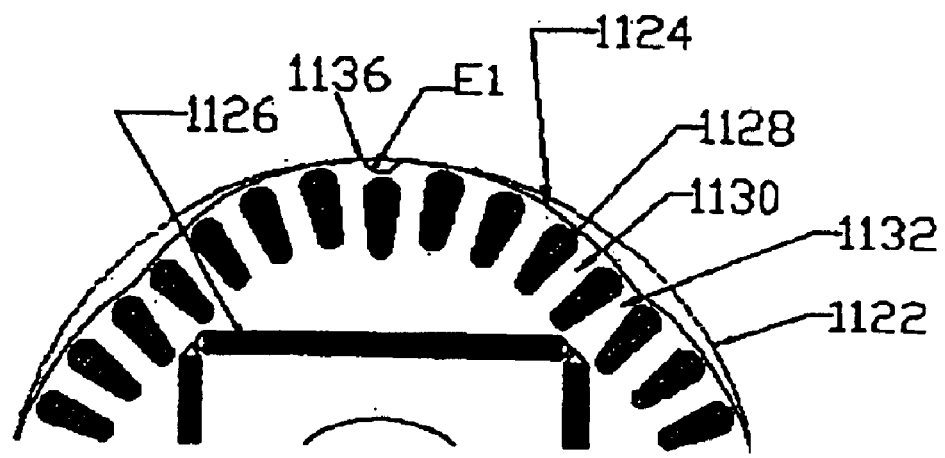
FIG. 13 is an enlarged partial schematic cross-sectional view of FIG. 12 to highlight the variation of the curvature of the first eccentric circular arcs of the surface of the magnetic poles of the first embodiment of the invention in contrasting with the circular arc of a magnetic pole.

In the first embodiment as shown in FIG. 11, 12, and 13, as well as in the second embodiment as shown in FIG. 16, and 17, the number of the conductive bar slots 1128 in each of the fan-shaped magnetic poles A, B, C, and D is an even number. Under this situation, the semi-circle recesses E1, F1, G1, and H1 in fan-shaped magnetic poles A, B, C, and D respectively locates in the space (i.e. the rotor's tooth part 1130) between the two adjacent conductive bar slots 1128. However, in the first embodiment as shown in FIG. 14, as well as in the second embodiment as shown in FIG. 18, the number of the conductive bar slots 1128 in each of the fan-shaped magnetic poles A, B, C, and D is an odd number. Under this situation, the semi-circle recesses E1, F1, G1, and H1 at points e1, f1, g1, and h1 in fan-shaped magnetic poles A, B, C, and D respectively align with the conductive bar slots 1128. Therefore, the conductive bar slots 1128 at point e1, f1, g1, and h1 need to adequately move toward the center O1 of the "first eccentric circular arcs of the surface of the magnetic poles".

FIG. 13 is an enlarged partial cross-sectional view of FIG. 14. The dot lines in both FIG. 14 and FIG. 13 indicate circular arcs 1122 of the surface of the magnetic poles of the rotor 1121 having center O and radius R. This is for highlighting the variation of the curvature of "the first eccentric circular arcs of the surface of the magnetic poles" 1124 having center O1 and radius R1 comparing with the circular arcs 1122.

Figure 15:
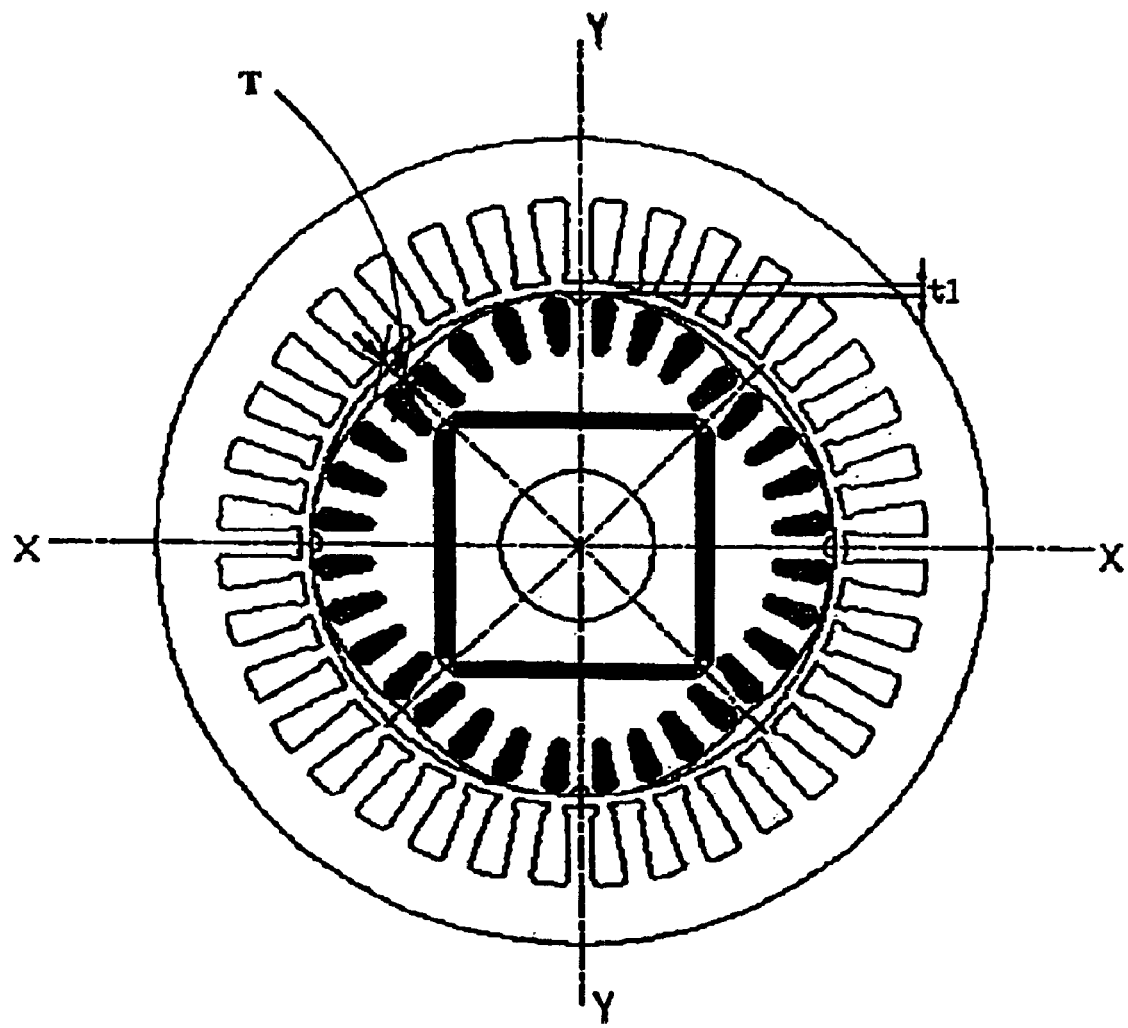
FIG. 15 is a schematic cross-sectional view of the rotor structure of the LSPM synchronous motor of the first embodiment of the invention. It shows the distribution of the variation of the air gap thickness of the first eccentric circular arcs of the surface of the magnetic poles wherein the minimum and the maximum thickness of the air gap are t1 and T respectively.

As shown in FIG. 15 and also referring to FIG. 12, as mentioned above, the surface of the magnetic pole of the fan-shaped magnetic poles A, B, C, and D of the rotor 1121 of the invention employs "first eccentric circular arcs of the surface of the magnetic poles" having their centers O1 offset from the centers O of curvature of the surface of the magnetic pole of the rotor 1121. The "first eccentric circular arcs 1124 of the surface of the magnetic poles" make the thickness of the air gap 1111 (see also FIG. 11) form a non-uniform and gradual variation of distribution. The minimum air gap thickness is t1 positioned at points e1, f1, g1, and h1 where semi-circle recesses E1, F1, G1, and H1 are located and are also the midpoints of the first eccentric circular arcs ab, bc, cd, and da of the surface in the magnetic poles A, B, C, and D. The maximum air gap thickness is T positioned at the two end points a and b; b and c; c and d; as well as d and a of the first eccentric circular arcs first eccentric circular arcs ab, bc, cd, and da of the surface of the magnetic poles A, B, C, and D.

Figure 24:
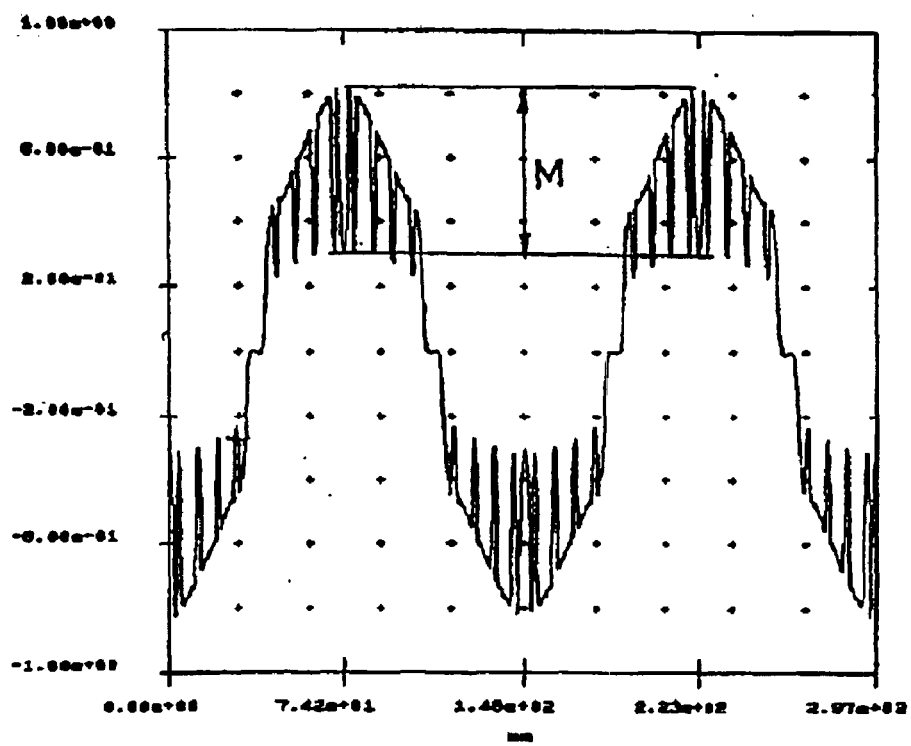
FIG. 24 is a distribution in radial direction of the air gap magnetic flux density of the motor of the LSPM synchronous motor of the first embodiment of the invention showing that its maximum reduction is M.
Figure 25:
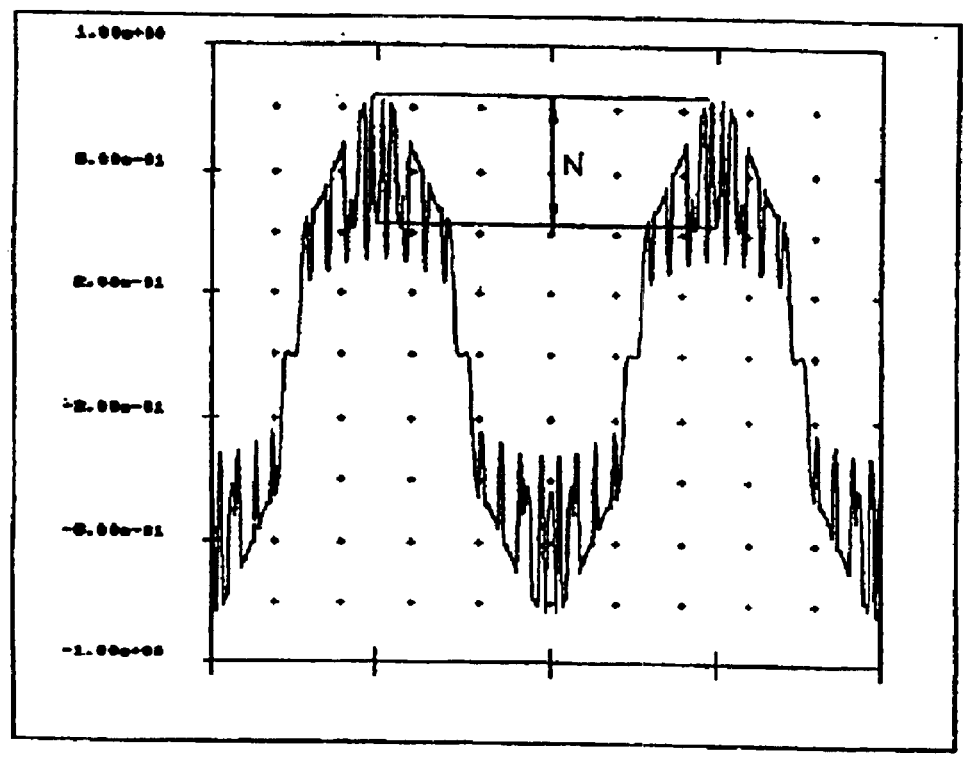
FIG. 25 is a distribution in radial direction of the air gap magnetic flux density of the motor of the LSPM synchronous motor of the second embodiment of the invention showing that its maximum reduction is N.
Figure 26:
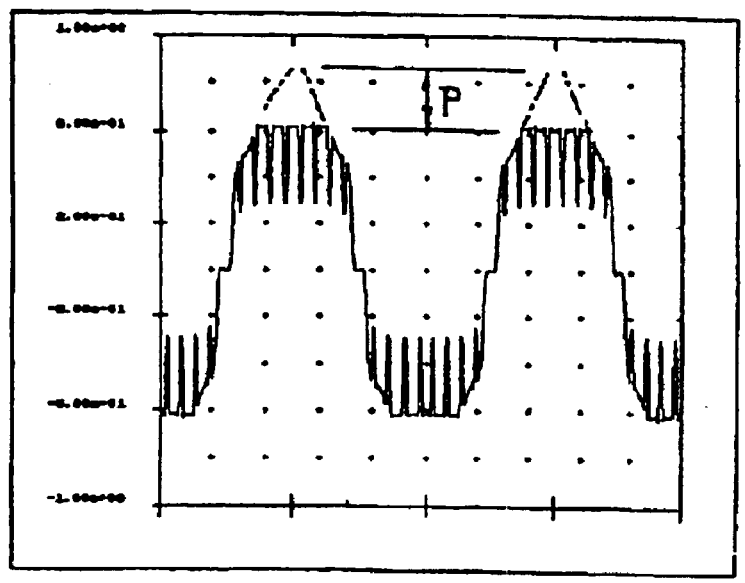
FIG. 26 is a distribution in radial direction of the air gap magnetic flux density of the motor of the LSPM synchronous motor of the third embodiment of the invention showing that its maximum reduction is P.

The offset length OS1 of the center of curvature O1 and the radius R1 of the "first eccentric circular arcs of the surface of the magnetic poles" can adequately adjust such that the ratio of the minimum air-gap thickness t1 and the maximum air gap thickness T varies from the range of 1:2 to 1:5, i.e. T=2t1~5t1. This is to make the radial component of the distribution of the magnetic flux density of the air gap very close to a sinusoidal wave in order to lower the cogging torque further. Moreover, the maximum values of radial component of the distribution of the magnetic flux density of the air gap can be adequately reduced. As shown in FIG. 24, the amount of reduction that occurs at the semi-circular recesses E1, F1, G1, and H1 is M in the first embodiment of the invention, while as shown in FIG. 25, the amount of reduction that occurs at the semi-circular recesses E1, F1, G1, and H1 is N in the second embodiment of the invention. Furthermore, as shown in FIG. 26, the amount of reduction that occurs at the midpoint of the second eccentric circular arcs 1901 of the surface of the magnetic poles in the third embodiment of the invention is P. In this way, it can further reduce the cogging torque, as well as the vibration and noise during the operation of the motor. What is more, the LSPM synchronous motor can slightly attenuate the magnetic flux of the magnetic pole to reduce the transient state during the operation from stop to start due to the self-retaining torque caused by the fan-shaped magnetic pole A, B, C, and D of the motor.

Figure 22:
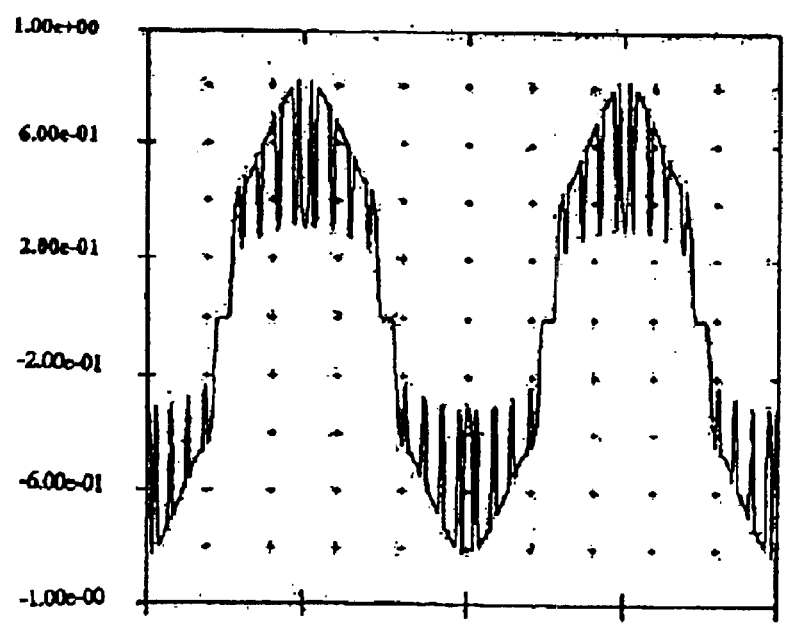
FIG. 22 is a distribution in radial direction of the air gap magnetic flux density of the motor of the LSPM synchronous motor of the first embodiment of the invention showing that it closes to a sinusoidal wave.
Figure 23:
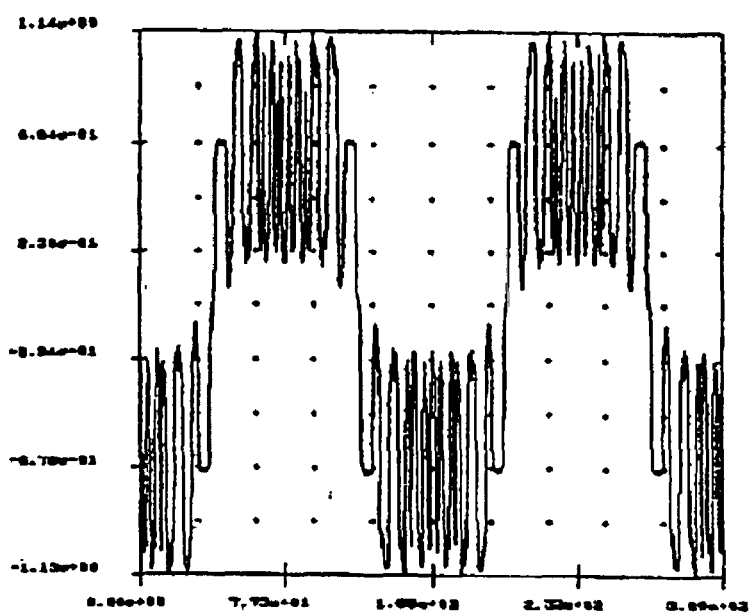
FIG. 23 is a distribution in radial direction of the air gap magnetic flux density of the motor of the LSPM synchronous motor of the prior art showing that it is far away from a sinusoidal wave.

In the third embodiment, one can adequately adjust the offset length OS2 of the center of curvature O2 and the radius R2 of the "second eccentric circular arcs 1901 of the surface of the magnetic poles A, B, C, and D" such that the ratio of the minimum air-gap thickness t2 and the maximum air gap thickness T varies from the range of 1:2 to 1:5, i.e. $T=2t2 \sim 5t2$. This is to accommodate the variation of the range of the air gap thickness. In this way, not only the motor can adequately reduce the self-retaining torque, but also the radial component of the magnetic flux density becomes very close to a sinusoidal wave distribution as shown in FIG. 22. As comparing with FIG. 22, the radial component of the distribution of the magnetic flux density of the air gap of the LSPM synchronous motor of the prior art as shown in FIG. 23 is very far away from the sinusoidal wave distribution.

In addition, the employment of the eccentric circular arcs of the surface of the magnetic poles makes the air gaps at both end of each of the fan-shaped magnetic poles A, B, C, or D relatively large. These relatively large air gaps can effectively attenuate the phenomenon of the demagnetization of the permanent magnet caused by the magnetic field of the stator's winding when the increase of the loading of the motor results in the increase of the magnetic field constituted by the stator's winding.

Figure 27:
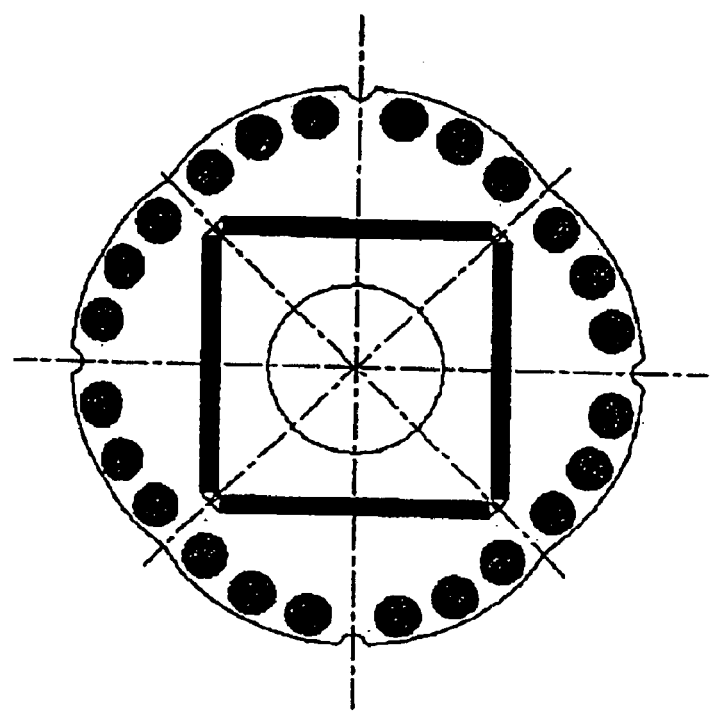
FIG. 27 is the first type of exemplary practice of each of the three embodiments of the LSPM synchronous motor of the invention showing that conductive bar slots of the rotor appears to be in circular shape.
Figure 28:
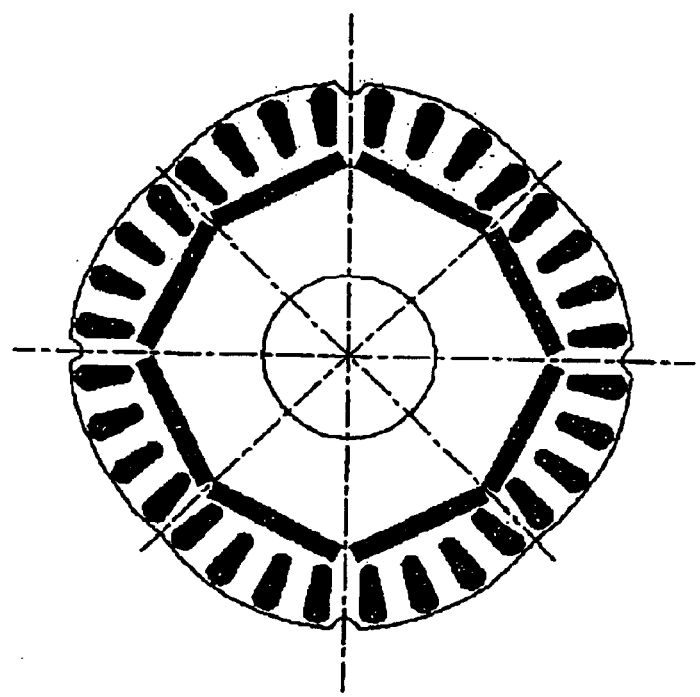
FIG. 28 is the second type of exemplary practice of each of the three embodiments of the LSPM synchronous motor of the invention wherein each of the permanent magnet of the fan-shaped magnetic poles is divided into two pieces such that the configuration of the eight permanent magnets of the rotor appears to be in octagon.
Figure 29:
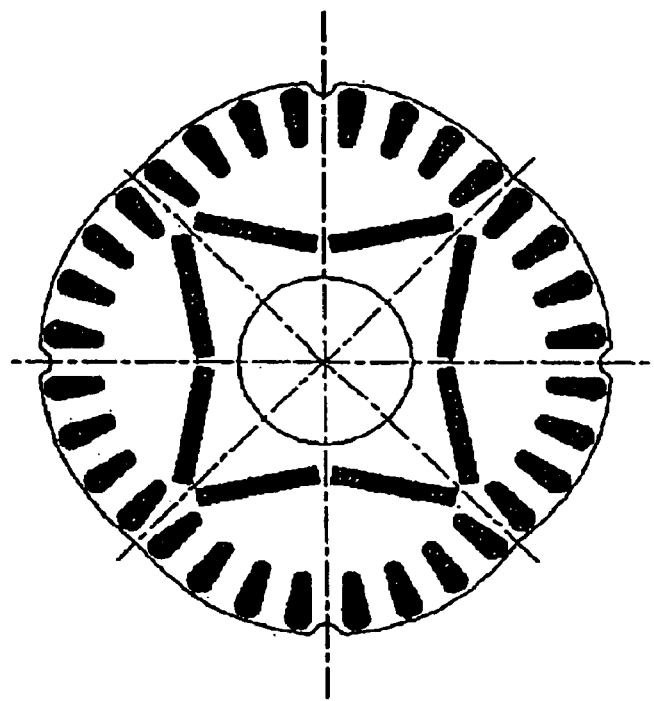
FIG. 29 is the third type of exemplary practice of each of the three embodiments of the LSPM synchronous motor of the invention wherein each of the permanent magnet of the fan-shaped magnetic poles is divided into two pieces such that the configuration of the eight permanent magnets of the rotor appears to be in four-piece petal.
Figure 30:
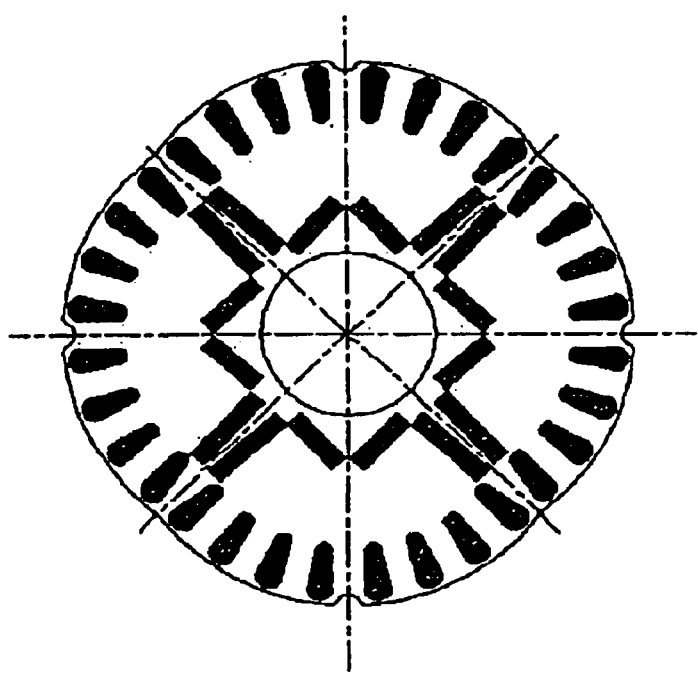
FIG. 30 is the fourth type of exemplary practice of each of the three embodiments of the LSPM synchronous motor of the invention wherein each of the permanent magnet of the fan-shaped magnetic poles is divided into four pieces such that the configuration of the eight permanent magnets of the rotor appears to be in badge shape.

As mentioned above, in each of the three embodiments, the conductive bar slots for forming the squirrel-cage-winding can have various kinds of configuration to meet the requirements of the starting torque and starting characteristic of LSPM synchronous motor. Moreover, the permanent magnet in each of the fan-shaped magnetic poles A, B, C, or D can be a single-piece as shown in FIG. 27, a double-piece as shown in FIG. 28 or FIG. 29, or a multiple-piece as shown in FIG. 30. Each of the embodiments has at least 4 exemplary practices as described below and shown in FIG. 27, 28, 29, and 30 respectively.

As shown in FIG. 27, in the first exemplary practice, the conductive bar slots of the rotor are in circular shape.

As shown in FIG. 28, in the second exemplary practice, the permanent magnet of each of the fan-shaped magnetic poles A, B, C, or D is divided into 2 pieces, each corresponds to a 45° central angle. Consequently, the configuration of an eight-permanent-magnet of the rotor appears to be an octagon.

As shown in FIG. 29, in the third exemplary practice, the permanent magnet of each of the fan-shaped magnetic pole A, B, C, or D is also divided into 2 pieces, and the permanent magnet corresponds to a 45° central angle too. Consequently, the configuration of an eight-permanent magnet of the rotor appears to be a four-piece petal.

As shown in FIG. 30, in the fourth exemplary practice, the permanent magnet of each of the fan-shaped magnetic pole A, B, C, or D is divided into four pieces. Consequently, the configuration of a 16-permanent-magnet of the rotor appears to be in badge shape.

The permanent magnets 1128 in the rotor 1121 of the invention are disposed on the inner side of the squirrel cage conductive bar slot 1128. Therefore, we can place the permanent magnets 1128 in the permanent magnet containing slots after the manufacturing process of casting the squirrel cage performs. In this way, demagnetization due to high temperature during the casting process will not occur for the permanent magnets. In addition, one can performs the measurement for the magnetic characteristics before placing the permanent magnets in the permanent magnet containing slots of the rotor in order to assure the stability and reliability of the performance of the LSPM synchronous motor.

As mentioned above, traditional LSPM synchronous motor has the demerits of having large cogging torque to make the motor vibrate and hard to start during the operation. Instead of using the high price material of rare earth permanent magnet having high magnetic energy product for the rotor to improve the performance of the motor, the traditional LSPM synchronous motor has to employ skew slot structure for the stator lamination. However, skew slot structure of the stator greatly increases the difficulty in the stator's winding work, thereby, increases the cost of manufacturing in large scale. By employing the eccentric circular arcs of the surface of the magnetic poles, the rotor can have the radial component of the distribution of the magnetic flux density of the air gap very close to a sinusoidal wave. Therefore, not only we can reduce the cogging torque as well as the vibration and noise of the motor during the operation, but also we can obtain relatively large magnetic flux in the magnetic poles and effectively increase the operating efficiency and power factor of the LSPM synchronous motor. In addition, the air gap at the end of each of the fan-shaped magnetic poles A, B, C, or D is relatively large. These relatively large air gaps can effectively attenuate the phenomenon of the demagnetization of the permanent magnet caused by the magnetic field of the stator's winding when the increase of the loading of the motor results in the increase of the magnetic field constituted by the stator's winding.

What is more, as mentioned above, the invention provides semi-circle recesses E1, F1, G1, and H1 at the midpoints of the "first eccentric circular arcs of the surface of the magnetic poles" of the fan-shaped magnetic poles A, B, C, and D. These semi-circle recesses E1, F1, G1, and H1 have diameters equal to the width w of the tooth-part 1103 of the stator 1101 and radius $r=w/2$. In this way, the LSPM synchronous motor can slightly attenuate the magnetic flux of the magnetic pole to reduce the transient state during the operation from stop to start due to the self-retaining torque caused by the fan-shaped magnetic pole A, B, C, and D of the motor. Therefore, we can improve the starting characteristic of the motor.

While we describe the invention by way of examples and in terms of the preferred embodiments, one should understand that the invention is not restricted to the disclosed embodiments. On the contrary, we intended to cover various modifications and similar arrangements as would be apparent to those skilled in the art. Therefore, we append the scope of the claims to accord the broadest interpretation to encompass all such modifications and similar arrangements.

What is claimed is:

1. A rotor structure of a line-start permanent magnet (LSPM) synchronous motor including an outer stator (or simply stator hereafter), an inner rotor (or simply rotor hereafter), and an air gap positioned between the stator and the rotor, wherein the inner loop of the stator has a plurality of stator tooth-part having tooth thickness w and a plurality of stator channel-part disposed in staggered manner and in annular shape while the rotor having a center O and a radius R of the circular arcs of the surface of the magnetic poles is divided into an inner loop and an outer loop, the motor comprises:

a shaft positioned at the center of the rotor;

four fan-shaped magnetic poles each having a 90° central angle and their arcs of the surface of the magnetic poles being defined as the "first eccentric circular arcs of the surface of the magnetic poles" with a center of the arc O1 (first eccentric points O1) being offset from the center O of the rotor, and a radius of R1, and therefore R−R1=OS1, also the first eccentric circular arcs of the surface of the magnetic poles making the maximum air gap thickness T two to five times as that of the minimum air gap thickness t1, therefore; $2t1 \leq T \leq 5t1$;

four permanent magnets each of them disposed in each of the fan-shaped magnetic poles in the inner loop of the rotor;

a plurality of conductive bar slots for forming squirrel cage winding, the conductive bar slots appearing in pear shape and being disposed in equal space, in annular shape, and in the outer loop of the rotor at each of the fan-shaped magnetic pole that make the space-part form salient tooth-part of the rotor, and the space-part between the fan-shaped magnetic pole is relatively small; and four recesses appearing in semi-circular shape with radius r and width w (equal to the stator's tooth thickness) and being provided at the mid-point of the first eccentric circular arcs of the surface of each of the fan-shaped magnetic poles and the locations of the recesses being aligned with the tooth-part of the rotor when the number of the conductive bar slots of the fan-shaped magnetic poles is an even number while the locations of the recesses being aligned with the conductive bar slots of the rotor when the number of the plurality of the conductive bar slots of the fan-shaped magnetic poles is an odd number;

wherein except that the conductive bar slots at the location of the semi-circular recesses needs to adequately offset toward the center O1 of the fan-shaped magnetic poles when the number of the conductive bar slots of the fan-shaped magnetic poles is an odd number of the conductive bar slots are in equal distance with respect to the center O1 of the fan-shaped magnetic poles.

2. The rotor structure of an LSPM synchronous motor as claimed in claim 1, wherein the conductive bar slots of the rotor are in circular shape.

3. The rotor structure of an LSPM synchronous motor as claimed in claim 1, wherein the permanent magnet of each of the fan-shaped magnetic poles is divided into two pieces, each correspond to a 45° central angle, and the configuration of an eight-permanent-magnet of the rotor appears to be an octagon.

4. The rotor structure of an LSPM synchronous motor as claimed in claim 1, wherein the permanent magnet of each of the fan-shaped magnetic poles is also divided into two pieces, each also correspond to a 45° central angle, the configuration of an eight-permanent magnet of the rotor appears to be a four-piece petal.

5. The rotor structure of an LSPM synchronous motor as claimed in claim 1, wherein the permanent magnet of each of the fan-shaped magnetic poles is divided into four pieces, the configuration of a sixteen-permanent-magnet of the rotor appears to be in badge shape.

6. The rotor structure of an LSPM synchronous motor as claimed in claim 1, wherein a semi-circle recess is provided on both sides of the original recess, there are three recesses in each of the four magnetic poles, and there will be twelve recesses all together and the location of the recesses depend on the following situations if the number of the plurality of conductive bar slots in each of the fan-shaped magnetic poles is an even number, the location of the recesses is aligned with the corresponding location of the tooth-part of the rotor, but if the number of the plurality of conductive bar slots in each of the fan-shaped magnetic poles is an odd number, the location of the recesses is aligned with the location of the conductive bar slots of the rotor.

7. The rotor structure of an LSPM synchronous motor as claimed in claim 6, wherein the conductive bar slots of the rotor are in circular shape.

8. The rotor structure of an LSPM synchronous motor as claimed in claim 6, wherein the permanent magnet of each of the fan-shaped magnetic poles is divided into two pieces, each correspond to a 45° central angle, the configuration of an eight-permanent-magnet of the rotor appears to be an octagon.

9. The rotor structure of an LSPM synchronous motor as claimed in claim 6, wherein the permanent magnet of each of the fan-shaped magnetic poles is also divided into two pieces, each also correspond to a 45° angle, the configuration of an eight-permanent magnet of the rotor appears to be a four-piece petal.

10. The rotor structure of an LSPM synchronous motor as claimed in claim 6, wherein the permanent magnet of each of the fan-shaped magnetic poles is divided into four pieces, the configuration of a sixteen-permanent-magnet of the rotor appears to be in badge shape.

11. The rotor structure of an LSPM synchronous motor as claimed in claim 1, wherein the recess at each of the fan-shaped magnetic poles is removed and replaced by an arc defined as the "second eccentric circular arc of the surface of the magnetic pole" with a center of the arc O2 (second eccentric points O2) being offset from the center O of the rotor, and a radius of R2, and therefore R2−R=OS2, also the second eccentric circular arcs of the surface of the magnetic poles make the maximum air gap thickness T two to five times as that of the minimum air gap thickness t2, therefore $2t2 \leq T \leq 5t2$.

12. The rotor structure of an LSPM synchronous motor as claimed in claim 11, wherein the conductive bar slots of the rotor are in circular shape.

13. The rotor structure of an LSPM synchronous motor as claimed in claim 11, wherein the permanent magnet of each of the fan-shaped magnetic poles is divided into two pieces, each correspond to a 45° central angle, and the configuration of an eight-permanent-magnet of the rotor appears to be an octagon.

14. The rotor structure of an LSPM synchronous motor as claimed in claim 11, wherein the permanent magnet of each of the fan-shaped magnetic poles is also divided into two pieces, each also correspond to a 45° central angle, the configuration of an eight-permanent magnet of the rotor appears to be a four-piece petal.

15. The rotor structure of an LSPM synchronous motor as claimed in claim 11, wherein the permanent magnet of each of the fan-shaped magnetic poles is divided into four pieces, the configuration of a sixteen-permanent-magnet of the rotor appears to be in badge shape.

* * * * *